(12) United States Patent
Zhang et al.

(10) Patent No.: US 9,616,419 B2
(45) Date of Patent: Apr. 11, 2017

(54) HYDROISOMERIZATION CATALYST MANUFACTURED USING A HIGH NANOPORE VOLUME ALUMINA SUPPORTS

(71) Applicant: CHEVRON U.S.A. INC., San Ramon, CA (US)

(72) Inventors: Yihua Zhang, Albany, CA (US); Kamala Raghunathan Krishna, Danville, CA (US); Guan-Dao Lei, Walnut Creek, CA (US); Theodorus Ludovicus Michael Maesen, Moraga, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/862,358

(22) Filed: Sep. 23, 2015

(65) Prior Publication Data

US 2016/0089666 A1   Mar. 31, 2016

Related U.S. Application Data

(60) Provisional application No. 62/057,360, filed on Sep. 30, 2014.

(51) Int. Cl.
| | | |
|---|---|---|
| *B01J 29/74* | (2006.01) | |
| *C10G 45/64* | (2006.01) | |
| *B01J 35/10* | (2006.01) | |
| *C10M 101/02* | (2006.01) | |
| *B01J 21/04* | (2006.01) | |
| *B01J 35/00* | (2006.01) | |

(52) U.S. Cl.
CPC ........... *B01J 29/74* (2013.01); *B01J 21/04* (2013.01); *B01J 29/7461* (2013.01); *B01J 29/7492* (2013.01); *B01J 35/00* (2013.01); *B01J 35/0026* (2013.01); *B01J 35/108* (2013.01); *B01J 35/1019* (2013.01); *B01J 35/1038* (2013.01); *B01J 35/1042* (2013.01); *B01J 35/1047* (2013.01); *B01J 35/1061* (2013.01); *C10G 45/64* (2013.01); *C10M 101/02* (2013.01)

(58) Field of Classification Search
CPC .............................. B01J 29/74; C10G 45/64
See application file for complete search history.

(56) References Cited

U.S. PATENT DOCUMENTS

| | | | |
|---|---|---|---|
| 2011/0000824 A1* | 1/2011 | Zhan | ............ B01J 35/1066 208/300 |
| 2011/0192766 A1* | 8/2011 | McCarthy | ............ B01J 21/063 208/120.1 |

* cited by examiner

*Primary Examiner* — Randy Boyer
(74) *Attorney, Agent, or Firm* — Michael D. Ross; Mark L. Warzel (57) ABSTRACT

The present invention is directed to an improved finished hydroisomerization catalyst manufactured from a first high nanopore volume (HNPV) alumina and a pore size distribution characterized by a full width at half-maximum, normalized to pore volume, of 15 to 25 nm·g/cc, and a second HNPV alumina having a pore size distribution characterized by a full width at half-maximum, normalized to pore volume, of 5 to 15 nm·g/cc. Their combination yields a HNPV base extrudate having a low particle density as compared to a conventional base extrudates.

20 Claims, 4 Drawing Sheets

HYDROISOMERIZATION CATALYST MANUFACTURED USING A HIGH NANOPORE VOLUME ALUMINA SUPPORTS

FIELD OF THE INVENTION

The present invention is directed to an improved finished hydroisomerization catalyst manufactured from a first high nanopore volume (HNPV) alumina having a broad pore size distribution (BPSD), and a second HNPV alumina having narrow pore size distribution (NPSD). Their combination yields a HNPV base extrudate having a low particle density as compared to a conventional base extrudates. The base extrudate is formed from the two HNPV aluminas and a molecular sieve suitable for base oil production. Finished hydroisomerization catalysts employing the HNPV base extrudate produce lubricating base oils in higher yields and quality, as compared to conventional hydroisomerization catalysts.

BACKGROUND OF THE INVENTION

Catalytic hydroprocessing refers to petroleum refining processes in which a hydrocarbon feedstock is brought into contact with hydrogen and a catalyst, at a higher temperature and pressure, for the purpose of removing undesirable impurities and/or converting the feedstock to an improved product.

Hydroisomerization is an important refining process used to catalytically dewax hydrocarbon feedstocks to improve the low temperature properties of lubricating base oil and fuel fractions. Catalytic dewaxing removes long chain n-paraffins from the feedstock which, if otherwise not removed, have a negative impact on the pour and cloud points of the fractions; however, dewaxing also lowers the Viscosity Index (VI) of the base oil fraction as well. A high VI is necessary to provide the base oil with temperature range insensitivity, meaning the base oil is capable of providing lubricity at both low and high temperatures.

Refiners operating a catalytic dewaxing unit wish to maximize yields and meet the target product specifications (VI, pour point), while minimizing the reactor temperature (which corresponds to costly hydrogen consumption and VI reduction at higher temperatures) and light ends ($C_4^-$) production.

Lubricating base oil distillate fractions are generally referred to as neutrals, e.g. heavy neutral, medium neutral and light neutral. The American Petroleum Institute (API) classifies finished lubricating base oils into groups. API Group II base oils have a saturates content of 90 wt. % or greater, a sulfur content of not more than 0.03 wt. % and a VI of greater than 80 but less than 120. API Group III base oils are the same as Group II base oils except the VI is at least 120.

Generally, conventional hydroisomerization catalysts are composed of (1) at least one molecular sieve suitable for isomerizing long-chain n-paraffins; (2) a binding material (also referred to as the "support material") such as alumina, titania, silica, etc; and (3) one or more active hydrogenation/dehydrogenation metals selected from Groups 6 and 8-10 of the Periodic Table, particularly platinum and palladium.

There are two broad classes of reactions that occur in the hydroisomerization process. The first class of reactions involves hydrogenation/dehydrogenation, in which aromatic impurities are removed from the feedstock by saturation. The second class of reactions involves isomerization, in which long chain n-paraffins are isomerized to their branched counterparts.

Hydroisomerization catalysts are bifunctional: hydrotreating is facilitated by the hydrogenation function provided by the metal components, and the isomerization reaction is facilitated by the acidic molecular sieve components. Both reactions need the presence of high pressure hydrogen.

During dewaxing, the wax molecules (straight chain paraffins) undergo series of hydroconversions: hydroisomerization, redistribution of branches and secondary hydroisomerization. The process starts with increasing the degree of branching through consecutive hydroisomerization accompanied by redistribution of branches. When the degree of branching increases, the probability of cracking increases, which will result in formation of fuels and decrease in lube yield. The improvement in porosity of the hydroisomerization catalyst favors minimizing the formation of hydroisomerization transition species by lowering the residence time and by increasing the sweeping efficiency, thus decreases the probability of cracking. This leads to the enhancement in the hydroisomerization performance.

Accordingly, there is a current need for a hydroisomerization catalyst that exhibits a higher degree of hydrogen efficiency and greater product yield and quality, as compared to conventional hydroisomerization catalysts.

SUMMARY OF THE INVENTION

The present invention is directed to an improved finished hydroisomerization catalyst manufactured from a high nanopore volume (HNPV) base extrudate. The HNPV base extrudate is manufactured from (1) a first HNPV alumina having a broad pore size distribution, (2) a second HNPV alumina having narrow pore size distribution, and (3) a molecular sieve suitable for base oil production.

The finished hydroisomerization catalysts employing the novel combination of HNPV aluminas exhibit improved hydrogen efficiency, and greater product yield and quality as compared to conventional hydroisomerization catalysts containing conventional alumina components. This unique combination of support materials provides for a finished hydroisomerization catalyst that is particularly suited for hydroprocessing disadvantaged feedstocks.

DETAILED DESCRIPTION OF THE INVENTION

Introduction

"Periodic Table" refers to the version of IUPAC Periodic Table of the Elements dated Jun. 22, 2007, and the numbering scheme for the Periodic Table Groups is as described in Chemical and Engineering News, 63(5), 27 (1985).

"Hydroprocessing" or "hydroconversion" refers to a process in which a carbonaceous feedstock is brought into contact with hydrogen and a catalyst, at a higher temperature and pressure, for the purpose of removing undesirable impurities and/or converting the feedstock to a desired product. Such processes include, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydroisomerization including selective hydroisomerization. Depending on the type of hydroprocessing and the reaction conditions, the products of hydroprocessing can show improved physical properties such as improved viscosities, viscosity indices, saturates content, low temperature properties, volatilities and depolarization.

"Hydroisomerization" refers to a process in which hydrogenation and accompanies the isomerization of n-paraffinic hydrocarbons into their branched counterparts.

"Hydrocarbonaceous" means a compound or substance that contains hydrogen and carbon atoms, but which can include heteroatoms such as oxygen, sulfur or nitrogen.

"Lube oil, "base oil" and" lubricating base oil are synonymous.

"LHSV" means liquid hourly space velocity.

"SCF/BBL" (or scf/bbl, or scfb or SCFB) refers to a unit of standard cubic foot of gas ($N_2$, $H_2$, etc.) per barrel of hydrocarbon feed.

"Nanopore" means pores having a diameter between 2 nm and 50 nm, inclusive.

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

All numerical ranges stated herein are inclusive of the lower and upper values stated for the range, unless stated otherwise.

Properties for materials described herein are determined as follows:

(a) Surface area: determined by $N_2$ adsorption at its boiling temperature. BET surface area is calculated by the 5-point method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(b) Nanopore diameter and volume: determined by $N_2$ adsorption at its boiling temperature and calculated from $N_2$ isotherms by the BJH method described in E. P. Barrett, L. G. Joyner and P. P. Halenda, "The determination of pore volume and area distributions in porous substances. I. Computations from nitrogen isotherms." J. Am. Chem. Soc. 73, 373-380, 1951. Samples are first pre-treated at 400° C. for 6 hours in the presence of flowing, dry $N_2$ so as to eliminate any adsorbed volatiles like water or organics.

(c) API gravity: the gravity of a petroleum feedstock/product relative to water, as determined by ASTM D4052-11.

(d) Polycyclic index (PCI): as measured by ASTM D6397-11.

(e) Viscosity index (VI): an empirical, unit-less number indicated the effect of temperature change on the kinematic viscosity of the oil. The higher the VI of a base oil, the lower its tendency to change viscosity with temperature. Determined by ASTM 2270-04.

(f) Viscosity: a measure of fluid's resistance to flow as determined by ASTM D445.

(g) Water pore volume: a test method to determine the amount of water that a gram of catalyst can hold in its pores. Weigh out 5-10 grams of sample (or amount specified by the engineer) in a 150 ml. beaker (plastic). Add deionized water enough to cover the sample. Allow to soak for 1 hour. After 1 hour, decant the liquid until most of the water has been removed and get rid of excess water by allowing a paper towel absorb the excess water. Change paper towel until there is no visible droplets on the walls of the plastic beaker. Weigh the beaker with sample. Calculate the Pore volume as follows:

$$F-I=W*$$

F=final weight of sample
I=initial weight of sample
W*=weight or volume of water in the sample
PV=W*/I (unit is cc/gm)

(h) Particle density: Particle density is obtained by applying the formula D=M/V. M is the weight and V is the volume of the catalyst sample. The volume is determined by measuring volume displacement by submersing the sample into mercury under 28 mm Hg vacuum.

Hydroisomerization Catalyst Composition

The present invention is directed to an improved finished hydroisomerization catalyst manufactured from a high nanopore volume (HNPV) base extrudate. The HNPV base extrudate is manufactured from (1) a first high HNPV alumina having a broad pore size distribution (BPSD), (2) a second HNPV alumina having narrow pore size distribution (NPSD), and (3) a molecular sieve that is selective towards the isomerization of n-paraffins.

The composition of the finished catalyst, based on the bulk dry weight of the finished hydroisomerization catalyst, is described in Table 1 below.

TABLE 1

| | |
|---|---|
| 1$^{st}$ HNPV alumina support (BPSD) | 5-55 wt. % |
| 2$^{nd}$ HNPV alumina support (NPSD) | 5-55 wt. % |
| total molecular sieve content | 25-85 wt. % |
| total active metal content | 0.1-1.0 wt. % |
| total promoter content | 0-10 wt. % |

For each embodiment described herein, the first HNPV alumina component is characterized as broad pore size distribution (BPSD), as compared to an alumina base used in conventional hydroisomerization catalysts.

The HNPV, BPSD alumina used in the manufacture the finished hydroisomerization catalyst described herein have a PSD characterized by a full width at half-maximum (FWHM, normalized to pore volume) of 15 to 25 nm·g/cc, and a NPV (2 nm-50 nm) of 0.7 to 2 cc/g.

The HNPV, NPSD alumina used in the manufacture the finished hydroisomerization catalyst described herein has a full width at half-maximum (FWHM, normalized to pore volume) of 5 to 15 nm·g/cc and a NPV (2-50 nm) of 0.7 to 2 cc/g.

The HNPV alumina support components used in the hydroisomerization catalysts of the present invention, and base extrudates formed from these components, are characterized as having the properties described in Tables 2 and 3 below, respectively.

TABLE 2

| | 1st HNPV alumina support (BPSD) | 2nd HNPV alumina support (NPSD) |
|---|---|---|
| d10 (nm) | 40-70 | 60-90 |
| d50 (nm) | 90-110 | 130-160 |
| d90 (nm) | 240-260 | 190-220 |
| Peak Pore Diameter (Å) | 50-70 | 140-200 |
| NPV - 6 nm-11 nm (cc/g) | 0.2-0.3 | 0.1-0.3 |
| NPV - 11 nm-25 nm (cc/g) | 0.15-0.35 | 0.35-0.65 |
| NPV - 25 nm-50 nm (cc/g) | 0.05-0.15 | 0.05-0.15 |
| Total NPV (2-50 nm) (cc/g) | 0.7-2 | 0.7-2 |
| BET surface area (m$^2$/g) | 300-400 | 200-300 |

TABLE 3

| | HNPV Base Extrudate |
|---|---|
| d10 (nm) | 30-50 |
| d50 (nm) | 80-100 |
| d90 (nm) | 180-200 |
| Peak Pore Diameter (Å) | 110-130 |
| NPV - 6 nm-11 nm (cc/g) | 0.25-0.4 |
| NPV - 11 nm-20 nm (cc/g) | 0.1-0.3 |
| NPV - 20 nm-50 nm (cc/g) | 0.04-0.1 |
| Total NPV (2-50 nm) (cc/g) | 0.7-1.2 |
| BET surface area (m$^2$/g) | 250-350 |
| WPV (water pore volume) (g/cc) | 0.6-1.0 |
| particle density (g/cc) | 0.75-0.95 |

The HNPV alumina supports are combined with the molecular sieve to form a HNPV base extrudate having a bimodal PSD suitable for hydroisomerizing n-paraffins while minimizing the conversion of the hydrocarbon molecules to fuels. A pore size distribution plot for the bimodal PSD HNPV base will indicate a maximum peak with a shoulder located at a pore size between 7 and 14 nm.

The improvement in porosity of the hydroisomerization catalyst favors minimizing the formation of hydroisomerization transition species by lowering the residence time and by increasing the sweeping efficiency, thus decreases the probability of hydrocracking. This leads to the enhancement in the hydroisomerization selectivity.

Finished hydroisomerization catalysts manufactured using the bimodal PSD HNPV base extrudate of the present invention exhibit improved hydrogen efficiency, and greater product yield and quality as compared to conventional hydroisomerization catalysts containing pure conventional alumina components.

For each embodiment described herein, the amount of the HNPV, BPSD alumina component in the finished hydroisomerization catalyst is from 10 wt. % to 60 wt. % based on the bulk dry weight of the hydroisomerization catalyst. In one subembodiment, the amount of the HNPV, BPSD alumina component in the hydroisomerization catalyst is from 20 wt. % to 40 wt. % based on the bulk dry weight of the finished hydroisomerization catalyst.

For each embodiment described herein, the amount of the HNPV, NPSD alumina component in the finished hydroisomerization catalyst is from 10 wt. % to 60 wt. % based on the bulk dry weight of the hydroisomerization catalyst. In one subembodiment, the amount of the HNPV, NPSD alumina component in the hydroisomerization catalyst is from 10 wt. % to 30 wt. % based on the bulk dry weight of the finished hydroisomerization catalyst.

For each embodiment described herein, the hydroisomerization catalyst contains one or more medium pore molecular sieves selected from the group consisting of MFI, MEL, TON, MTT, *MRE, FER, AEL and EUO-type molecular sieves, and mixtures thereof.

In one subembodiment, the molecular sieve is selected from the group consisting of SSZ-32, small crystal SSZ-32, ZSM-23, ZSM-48, MCM-22, ZSM-5, ZSM-12, ZSM-22, ZSM-35 and MCM-68-type molecular sieves, and mixtures thereof.

In one subembodiment, the one or more molecular sieves selected from the group consisting of molecular sieves having a *MRE framework topology, molecular sieves having a MTT framework topology, and mixtures thereof.

The amount of molecular sieve material in the finished hydroisomerization catalyst is from 20 wt. % to 80 wt. % based on the bulk dry weight of the hydroisomerization catalyst. In one subembodiment, the amount of molecular sieve material in the finished hydroisomerization catalyst is from 30 wt. % to 70 wt. %.

As described herein above, the finished hydroisomerization catalyst of the present invention contains one or more hydrogenation metals. For each embodiment described herein, each metal employed is selected from the group consisting of elements from Groups 8 through 10 of the Periodic Table, and mixtures thereof. In one subembodiment, each metal is selected from the group consisting of platinum (Pt), palladium (Pd), and mixtures thereof.

The total amount of metal oxide material in the finished hydroisomerization catalyst is from 0.1 wt. % to 1.5 wt. % based on the bulk dry weight of the hydroisomerization catalyst. In one subembodiment, the hydroisomerization catalyst contains from 0.3 wt. % to 1.2 wt. % of platinum oxide based on the bulk dry weight of the hydroisomerization catalyst.

The finished hydroisomerization catalyst of the present invention may contain one or more promoters selected from the group consisting of magnesium (Mg), calcium (Ca), strontium (Sr), barium (Ba), potassium (K), lanthanum (La), praseodymium (Pr), neodymium (Nd), chromium (Cr), and mixtures thereof. The amount of promoter in the hydroisomerization catalyst is from 0 wt. % to 10 wt. % based on the bulk dry weight of the hydroisomerization catalyst. In an embodiment, a catalyst of the present invention contains from 0.5 to about 3.5 wt % of Mg. While not being bound by theory, such metals may effectively reduce the number of acid sites on the molecular sieve of the metal-modified hydroisomerization catalyst, thereby increasing the catalyst's selectivity for isomerization of n-paraffins in the feed.

Hydroisomerization Catalyst Preparation

In general, the hydroisomerization catalyst of the present invention is prepared by:
 (a) mixing and pepertizing the 1$^{st}$ and 2$^{nd}$ alumina supports with at least one molecular sieve to make an extrudate base;
 (b) impregnate the base with a metal impregnation solution containing at least one metal; and
 (c) post-treating the extrudates, including subjecting the metal-loaded extrudates to drying and calcination.

Prior to impregnation, the extrudate base is dried at temperature between 90° C. and 150° C. (194° F.-302° F.) for 1-12 hours, followed by calcination at one or more temperatures between 199° C. and 593° C. (390° F.-1100° F.).

The impregnation solution is made by dissolving metal precursors in deionized water. The concentration of the solution was determined by the pore volume of the support and metal loading. During a typical impregnation, the support is exposed to the impregnation solution for 0.1-10 hours. After soaking for another 0.1-10 hours, the catalyst is dried at one or more temperatures in the range of 38° C.-149° C. (100° F.-300° F.) for 0.1-10 hours. The catalyst is further calcined at one or more temperatures in the range of 316° C.-649° C. (600° F.-1200° F.), with the presence of sufficient air flow, for 0.1-10 hours.

Hydroisomerization Overview

As noted above, the finished hydroisomerization catalysts employing using the novel combination of the alumina components exhibit improved hydrogen efficiency, and greater product yield and quality as compared to conventional hydroisomerization catalysts containing conventional alumina components. This unique combination of the alumina supports provides for a finished hydroisomerization catalyst that is particularly suited for hydroprocessing disadvantaged feedstocks.

Depending on the feedstock, target product slate and amount of available hydrogen, the catalyst of the present invention can be used alone or in combination with other conventional hydroisomerization catalysts.

Finished hydroisomerization catalysts and catalysts systems useful with the finished hydroisomerization catalysts of the present invention are disclosed in U.S. Pat. Nos. 8,617,387 and 8,475,648, and U.S. Publication No. US 2011-0315598 A1.

The following examples will serve to illustrate, but not limit this invention.

EXAMPLE 1

Preparation of Catalysts 1, 2 and 3

Conventional catalyst 1 was prepared using 55 wt. % pseudo-boehmite alumina according to the method disclosed in U.S. Pat. No. 8,790,507 B2 to Krishna et al., granted on Jul. 29, 2014. The dried and calcined extrudate was impregnated with a solution containing platinum. The overall platinum loading was 0.325 wt. %.

Catalyst 2 was prepared as described for conventional catalyst 1 by partially replacing the conventional alumina with a 37.5 wt. % HNPV alumina powder having a broad pore size distribution (BPSD). The properties of the BPSD HNPV alumina are described in Table 5 below.

Catalyst 3 was prepared as described for conventional catalyst 1 except that conventional alumina was not used, and instead 20 wt. % of a HNPV alumina having a narrow pore size distribution (NPSD) and 35 wt. % of a HNPV alumina having a BPSD were used as the binding material. The properties of the NPSD HNPV alumina are described in Table 5 below.

The composition of the three catalysts is described in Table 4 below.

TABLE 4

| | conventional catalyst 1 | catalyst 2 | catalyst 3 |
|---|---|---|---|
| conventional alumina | 55% | 17.5% | — |
| HNPV NPSD alumina | — | — | 20% |
| HNPV BPSD alumina | — | 37.5% | 35% |
| SSZ-32x | 45% | 45% | 45% |

The pore properties of the binding materials (aluminas) are described in Table 5 below.

TABLE 5

| Alumina | conventional alumina | HNPV BPSD alumina | HNPV NPSD alumina |
|---|---|---|---|
| $D_{50}$, Å (2-50 nm) | 67 | 99 | 147 |
| FWHM, Å | 32 | 157 | 77 |
| Pore Volume, cc/g (2-50 nm) | 0.55 | 0.71 | 0.87 |

The pore properties of the catalyst base (extruded and calcined zeolite and aluminas) are described in Table 6 below.

TABLE 6

| Base Extrudate | conventional catalyst 1 | catalyst 2 | catalyst 3 |
|---|---|---|---|
| $D_{50}$, Å (2-50 nm) | 66 | 81 | 93 |
| FWHM, Å | 47 | 88 | 91 |
| Pore Volume, cc/g (2-50 nm) | 0.6 | 0.78 | 0.81 |
| ΔPV, % | 0 | 30 | 35 |

Additional pore properties of the aluminas are described in Table 7 below.

TABLE 7

| Alumina | conventional alumina | HNPV BPSD alumina | HNPV NPSD alumina |
|---|---|---|---|
| d10 (nm) | 38 | 51 | 69 |
| d50 (nm) | 67 | 97 | 147 |
| d90 (nm) | 96 | 258 | 201 |
| Peak Pore Diameter (Å) | 73 | 61 | 167 |
| NPV - 6 nm-11 nm (cc/g) | 0.33 | 0.26 | 0.18 |
| NPV - 11 nm-20 nm (cc/g) | 0.03 | 0.19 | 0.54 |
| NPV - 20 nm-50 nm (cc/g) | 0 | 0.12 | 0.09 |
| Total NPV (2-50 nm) (cc/g) | 0.55 | 0.71 | 0.87 |
| BET surface area (m$^2$/g) | 296 | 380 | 226 |

Figure 1:
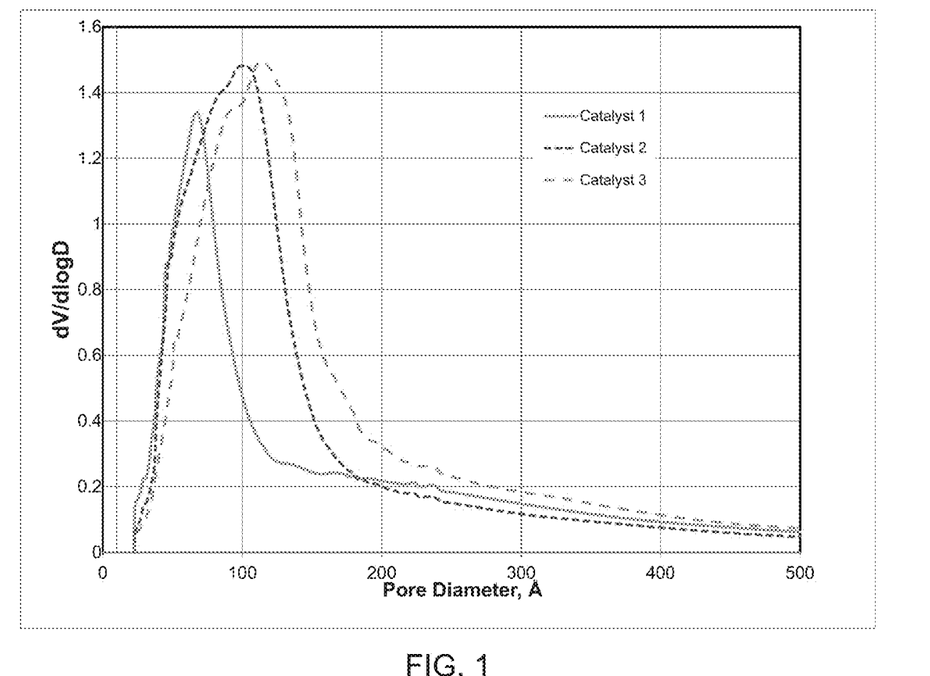
FIG. 1 is a plot of the pore size distributions for three catalysts described in the examples herein below.

Additional pore properties of the base extrudates are described in Table 8 below. A plot of the pore size distributions is illustrated in FIG. 1.

TABLE 8

| Base Extrudate | conventional catalyst 1 | catalyst 2 | catalyst 3 |
|---|---|---|---|
| d10 (nm) | 38 | 43 | 43 |
| d50 (nm) | 66 | 81 | 93 |
| d90 (nm) | 190 | 150 | 184 |
| Peak Pore Diameter (Å) | 67 | 101 | 113 |
| NPV - 6 nm-11 nm (cc/g) | 0.23 | 0.36 | 0.31 |
| NPV - 11 nm-20 nm (cc/g) | 0.07 | 0.15 | 0.23 |
| NPV - 20 nm-50 nm (cc/g) | 0.05 | 0.04 | 0.07 |
| Total NPV (2-50 nm) (cc/g) | 0.60 | 0.78 | 0.81 |
| BET surface area (m$^2$/g) | 314 | 339 | 314 |
| WPV, (g/cc) | 0.58 | 0.67 | 0.77 |
| particle density (g/cc) | 0.95 | 0.91 | 0.89 |

EXAMPLE 2

Hydroisomerization Performance

Catalysts 1, 2 and 3 were used to hydroisomerize a light neutral vacuum gas oil (VGO) hydrocrackate feedstock having the properties outlined in Table 9 below.

TABLE 9

| Properties | Feedstock |
|---|---|
| gravity, °API | 34 |
| S, wt % | 6 |
| viscosity index at 100° C. (cSt) | 3.92 |
| viscosity index at 70° C. (cSt) | 7.31 |
| wax, wt % | 12.9 |
| DWO VI | 101 |
| DWO Vis@100 C., cSt | 4.08 |
| DWO Vis@40 C., cSt | 20.1 |
| Distillation Temperature (wt %), ° F. (° C.) | |
| 0.5 | 536 (280) |
| 5 | 639 (337) |
| 10 | 674 (357) |
| 30 | 735 (391) |
| 50 | 769 (409) |
| 70 | 801 (427) |
| 90 | 849 (454) |
| 95 | 871 (466) |
| 99.5 | 910 (488) |

The reaction was performed in a micro unit equipped with two fix bed reactor. The run was operated under 2100 psig total pressure. Prior to the introduction of feed, the catalysts were activated by a standard reduction procedure. The feed was passed through the hydroisomerization reactor at a liquid hour space velocity (LHSV) of 2, and then was hydrofinished in the 2nd reactor as described in U.S. Pat. No. 8,790,507B2, which was loaded with a Pd/Pt catalyst to further improve the lube product quality. The hydrogen to oil ratio was about 3000 scfb. The lube product was separated from fuels through the distillation section.

Pour point, cloud point, viscosity, viscosity index and simdist were collected on the products.

Table 10 below describes the lube oil product yield for the three catalysts.

TABLE 10

| Catalyst | conventional catalyst 1 | catalyst 2 | catalyst 3 |
|---|---|---|---|
| Yield of lube product, wt % | Base | +0.9 | +1.4 |

Figure 2:
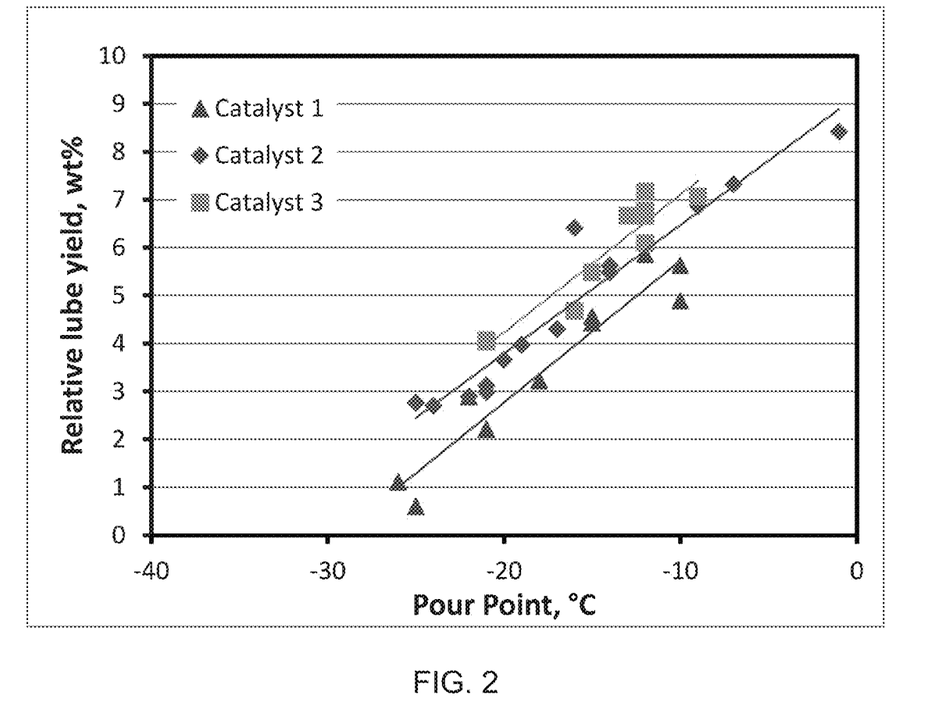
FIG. 2 is a plot of the lube yield as a function of product pour point for the three catalysts described.
Figure 3:
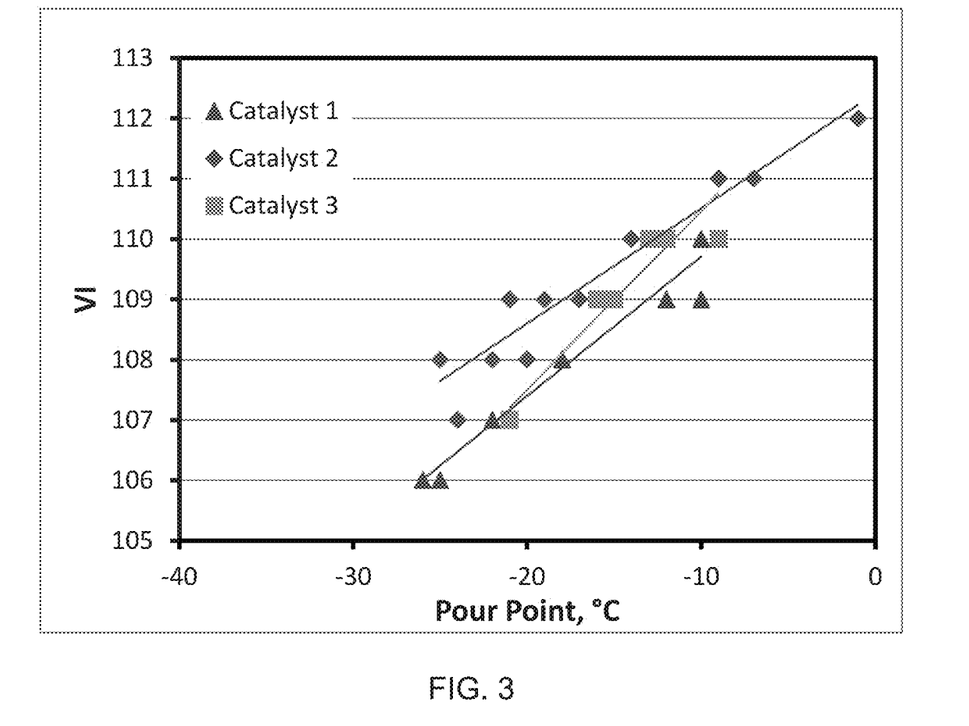
FIG. 3 is a plot of the viscosity index (VI) as a function of product pour point for the three catalysts.
Figure 4:
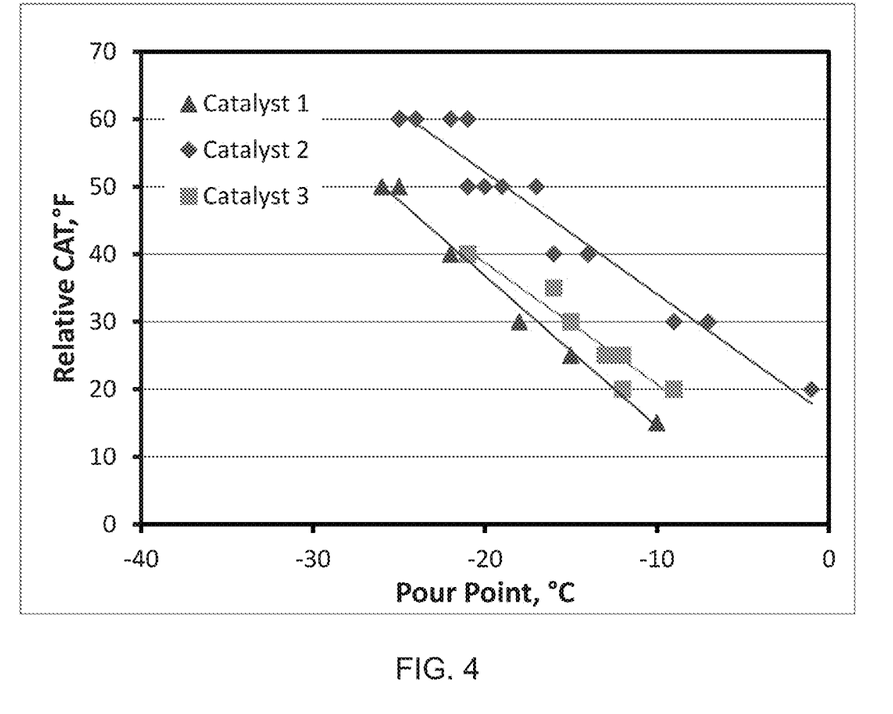
FIG. 4 is a plot of the product pour point as a function of reaction temperature for the three catalysts.

FIG. 2 is a plot of the lube yield as a function of the product pour point for the three catalysts. FIG. 3 is a plot of visocosity index (VI) as a function of the product pour point for the three catalysts. FIG. 4 is a plot of the product pour point as a function of reaction temperature (cat. temperature) for the three catalysts.

Compared to catalyst 1, catalyst 2 gained about 1 wt. % lube product. Catalyst 3 generated 1.4 wt. % more lube product. Both catalysts 2 and 3 have higher nanopore volume and larger nanopore size. Combined with a bimodal pore size distribution, catalysts 2 and 3 generated less fuels and gas. Regarding the activity, both Catalyst 1 and 3 were about 10° F. more active than Catalyst 2.

While the invention has been described in detail and with reference to specific embodiments thereof, it will be apparent to one skilled in the art that various changes and modifications can be made without departing from the spirit and scope of the invention.

What is claimed is:

1. A hydroisomerization catalyst, comprising:
a base extrudate comprising
at least one molecular sieve selective towards isomerization of n-paraffins,
a first alumina having a pore size distribution characterized by a full width at half-maximum, normalized to pore volume, of 15 to 25 nm·g/cc, and
a second alumina having a pore size distribution characterized by a full width at half-maximum, normalized to pore volume, of 5 to 15 nm·g/cc;
the catalyst further comprising at least one metal selected from the group consisting of elements from Group 6 and Groups 8 through 10 of the Periodic Table.

2. The hydroisomerization catalyst of claim 1, wherein the first alumina has a nanopore volume in the 2 nm to 50 nm range of 0.7 to 2 cc/g.

3. The hydroisomerization catalyst of claim 2, wherein the second alumina has a nanopore volume in the 2 nm to 50 nm range of 0.7 to 2 cc/g.

4. The hydroisomerization catalyst of claim 1, wherein the second alumina has a nanopore volume in the 2 nm to 50 nm range of 0.7 to 2 cc/g.

5. The hydroisomerization catalyst of claim 1, wherein a pore size distribution plot for the base extrudate will indicate a maximum peak with a shoulder located at a pore size between 7 and 14 nm.

6. The hydroisomerization catalyst of claim 1, wherein the base extrudate has a nanopore volume in the 6 nm to 11 nm range of 0.25 to 0.4 cc/g, a nanopore volume in the 11 nm to 20 nm range of 0.1 to 0.3 cc/g, and a nanopore volume in the 20 nm to 50 nm range of 0.04 to 0.1 cc/g.

7. The hydroisomerization catalyst of claim 1, wherein the base extrudate has a total nanopore volume in the 2 nm to 50 nm range of 0.7 to 1.2 cc/g.

8. The hydroisomerization catalyst of claim 1, wherein the base extrudate has a nanopore volume in the 6 nm to 11 nm range of 0.25 to 0.4 cc/g.

9. The hydroisomerization catalyst of claim 1, wherein the base extrudate has a particle density of 0.75 to 0.95 g/cc.

10. A process for hydroisomerization a hydrocarbonaceous feedstock, comprising contacting the feedstock with a hydroisomerization catalyst under hydroisomerization conditions to produce a hydroisomerized effluent;
the hydroisomerization catalyst comprising
a base extrudate comprising
at least one molecular sieve selective towards isomerization of n-paraffins,
a first alumina having a pore size distribution characterized by a full width at half-maximum, normalized to pore volume, of 15 to 25 nm·g/cc, and
a second alumina having a pore size distribution characterized by a full width at half-maximum, normalized to pore volume, of 5 to 15 nm·g/cc;
the catalyst further comprising at least one metal selected from the group consisting of elements from Group 6 and Groups 8 through 10 of the Periodic Table.

11. The process of claim 10, wherein the first alumina has a nanopore volume in the 2 nm to 50 nm range of 0.7 to 2 cc/g.

12. The process of claim 11, wherein the second alumina has a nanopore volume in the 2 nm to 50 nm range of 0.7 to 2 cc/g.

13. The process of claim 10, wherein the second alumina has a nanopore volume in the 2 nm to 50 nm range of 0.7 to 2 cc/g.

14. The process of claim 10, wherein a pore size distribution plot for the base extrudate will indicate a maximum peak with a shoulder located at a pore size between 7 and 14 nm.

15. The process of claim 10, wherein the base extrudate has a nanopore volume in the 6 nm to 11 nm range of 0.25 to 0.4 cc/g, a nanopore volume in the 11 nm to 20 nm range of 0.1 to 0.3 cc/g, and a nanopore volume in the 20 nm to 50 nm range of 0.04 to 0.1 cc/g.

16. The process of claim 10, wherein the base extrudate has a total nanopore volume in the 2 nm to 50 nm range of 0.7 to 1.2 cc/g.

17. The process of claim 10, wherein the base extrudate has a nanopore volume in the 6 nm to 11 nm range of 0.25 to 0.4 cc/g.

18. The process of claim 10, wherein the base extrudate has a particle density of 0.75 to 0.95 g/cc.

19. The hydroisomerization catalyst of claim 1, wherein the base extrudate has a bimodal pore size distribution.

20. The process of claim 10, wherein the base extrudate has a bimodal pore size distribution.

* * * * *